June 29, 1965  K. R. BROWN ETAL  3,191,311
COMPARATOR GAUGES
Filed Oct. 22, 1962
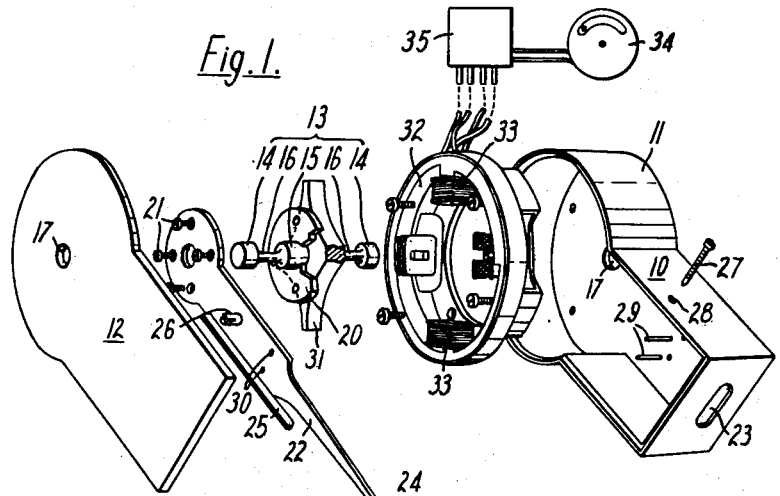
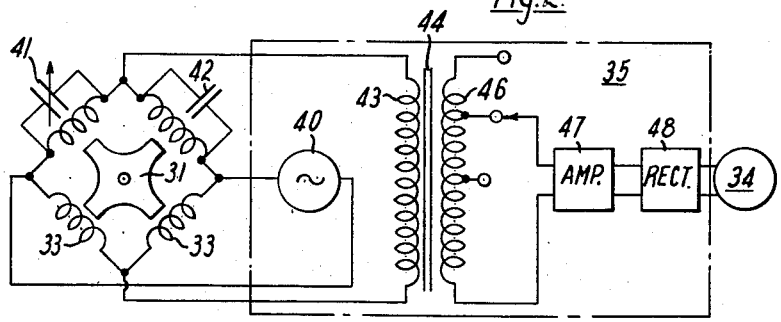
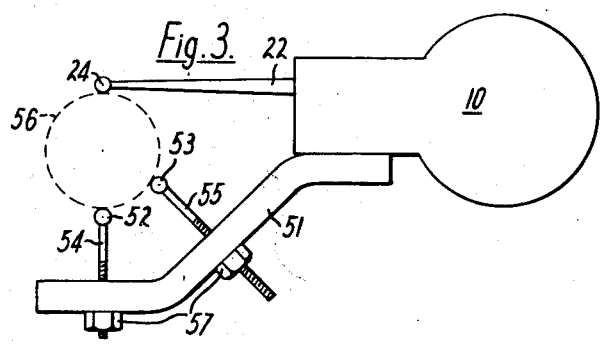
Inventor
K. R. BROWN
C. I. CRAWFORD
By
Cameron, Kerkam & Sutton
Attorneys

3,191,311
COMPARATOR GAUGES

Kenneth Robson Brown, Wilkieston, Kirknewton, Midlothian, and Charles Ian Crawford, Edinburgh, Scotland, assignors to Ferranti, Limited, Lancashire, England, a company of Great Britain and Northern Ireland
Filed Oct. 22, 1962, Ser. No. 232,054
Claims priority, application Great Britain, Oct. 25, 1961, 38,129/61
4 Claims. (Cl. 33—169)

This invention relates to comparator gauges for determining electromagnetically a dimension of a workpiece in comparison with either another workpiece or a standard, or for measuring such a dimension direct over a narrow range.

An object of the invention is to provide such a gauge of high accuracy which is to a large extent free from errors due to friction or backlash.

In accordance with the present invention, a comparator gauge includes in a supporting framework, such as a casing, a torsion rod having between a centre portion and each end portion a torsional portion which is of less torsional rigidity than the centre portion and that end portion and which transforms smoothly into them, the end portions being secured to the framework against rotation with respect to it, a probe arm secured at one end to the centre portion of the rod and extending radially from the rod to allow the tip of the free end of the arm to engage a workpiece, and an electrical pick-off system responsive to the angular position of the arm with respect to the framework.

In the accompanying drawings,

FIGURE 1 is a perspective view in exploded form of a comparator gauge in accordance with one embodiment of the invention, FIGURE 2 is a circuit diagram of part of the apparatus of FIGURE 1, and FIGURE 3 shows in elevation a gauge in accordance with another embodiment.

In carrying out the invention in accordance with one form by way of example, a comparator gauge includes a supporting framework in the form of a casing 10—see FIG. 1—consisting of a box portion 11 and a lid 12 containing a torsion rod 13. The rod is circular in section throughout its length and includes two end portions 14 and a centre portion 15, all of about the same diameter. Each end portion is joined to the centre portion by a torsional portion 16 of the rod which is of less diameter than the centre and end portions and is tapered outwards as it approaches the junctions with them so as to transform smoothly into them. On assembly, the end portions 14 are rigidly secured in apertures 17 in the casing against rotation relative to it.

The centre portion 15 of the rod carries a flange 20 to one face of which is secured by screws 21 one end of a probe arm 22 extends radially with respect to the rod so as to pass through an aperture 23 in the casing and ending in a spherical tip 24 outside said casing. Aperture 23 is large enough to allow the full range of movement of the probe and is sealed against the intrusion of dust by a flexible bellows or the like which is not shown.

To allow adjustment of the datum angular position of the probe 22 with respect to the casing, spring means is provided in the form of a strip 25 of spring steel parallel to the probe and secured at one end in a slot in a pin 26 extending from the probe; the other end—the free end— of the strip is adjustably engageble by a screw 27 operating in a threaded hole 28 in the casing 10 in the direction of the angular movement of the probe.

The probe is stayed against movements parallel to the axis of rod 13 by staying means in the form of two struts 29 secured at their ends to the casing and at their centres to the probe where they pass through it in holes 30. These struts 29 are elastic enough flexurally to allow movement of the probe arm 22 through the small angle required yet sufficiently inelastic lengthwise to prevent appreciable movement of the probe normal to the plane of its angular movement.

To the other side of flange 20 is secured the four-pole rotor 31 of a highly sensitive electromagnetic angular pick-off the co-operating stator 32 of which, carrying windings 33, is secured to the casing 10. One of the poles of the rotor 31 is depicted as broken away to show the other torsional portion 16 of rod 13. This pick-off may be of the form disclosed in either of United States patent specifications Nos. 2,990,527 or 3,001,127. The output signal from the pick-off windings 33 is displayed on a suitable instrument 34, such as a microammeter, by way of a stage 35, a suitable form of which is described below, it being obvious from FIG. 1 that both the instrument 34 and stage 35 may be structurally separate and positioned remotely from the casing 10 and probe arm 22.

In operation, the casing 10 is secured to some reference structure or mounted on a plane table and the tip 24 of probe arm 22 is applied to effect comparison of a dimension of a workpiece with that of another workpiece or a standard in known manner. The angular movements of the probe over the small range required are allowed by the torsional deformation of the torsional portions 16 of the rod 13 and are measured by the resulting response of the pick-off as indicated by instrument 34.

The datum angular position of the probe—for example, that required to zeroise the initial reading of instrument 34—may be adjusted by rotating screw 27 so as to bear to a greater or less extent on the free end of spring strip 25.

Any tendency of the probe to be deflected in a direction parallel to the axis of rod 13—due to, say, the slope of the workpiece surface that is being gauged—is prevented by struts 29.

It is desirable for the pick-off rotor 31 to be so angularly located with respect to the probe 22 that the pick-off operates over a linear part of its response throughout the range of movement of the probe, with the null output position of the rotor occurring somewhere in that range.

Screw 27, which may alternatively act by pulling or pushing on the free end of strip 25 according to the direction of rotation of the screw, may be used for adjusting the datum position of the probe itself rather than for zeroising the instrument. For example, where a wider range of workpiece dimensions are to be measured than can be accommodated within the range of probe movement from its central position, the datum position of the probe may be adjusted so as to lie at one end of the range rather than at its centre.

Screw 27 may also be used to adjust the contact pressure between the probe and the surface to be gauged, this pressure being due to the restoring force developed by the torsional portions 16 of the rod, together with the force exerted by spring strip 25, in response to the deflection of the probe from its equilibrium position by the workpiece.

By calibrating instrument 34 the gauge may be used for making direct measurements, within its narrow range of angular response.

Various circuits for stage 35 of the pick-off system are available. A suitable one is shown in FIG. 2. Here the four stator windings 33 associated with the four poles of rotor 31 of the pick-off are interconnected in bridge form and energised across two opposite points by an oscillator 40. Across any two adjacent ones of the windings 33 are connected a variable capacitor 41 and a fixed capacitor 42 respectively, the latter having approximately the mean capacitance of capacitor 41. The other two points of the bridge are connected to the respective ends of a primary winding 43 of a transformer 44 the secondary winding 46 of which is tapped to allow range selection; the tapped voltage is applied by way of an amplifier 47 and a phase-sensitive rectifier 48 to instrument 34, which is of the kind having a centre zero.

In operation, the bridge is balanced by adjusting capacitor 41 to its mean value. Any movement from a datum position of rotor 31 in one or other direction in response to movement of the probe upsets the balance of the stator bridge and so causes a change in the reading of instrument 34. By adjusting capacitor 41 in the approximate direction from its mean position the indication of instrument 34 may be set to zero or to any other datum scale reading independently of any adjustment of the datum position of the probe itself.

The datum reading of the instrument may alternatively be adjusted independently of the probe by rotating the stator of the pick-off relative to the casing, the stator being then fixed against such relative rotation once the adjustment has been made.

The spring means for adjusting the datum position of the probe may take various other forms than the very simple form described. A suitable alternative is to use two tension springs the adjacent ends of which act oppositely on the probe in the directions of its angular movement. The other end of one spring is fixed to the casing, the corresponding end of the other spring being adjustable towards or away from the probe in any convenient manner.

The torsion rod or bar may also take other forms than that described. The essential requirement is for there to be between each end portion and the centre portion a portion of less torsional rigidity which takes up the movement of the probe. This requirement would therefore be met by making the torsional portions of cruciform shape so as to be less torsional through having a reduced sectional area.

The use of end and centre portions of greater torsional rigidity than the intermediate torsional portions allows the rod to be securely fastened to the casing, and the probe to be fastened to the rod, as the case may be, against relative angular shifts, the smooth transformations of the less torsionally rigid portions into the more rigid ones serving to prevent any risk of local strains or deformations.

Pick-offs of other kinds may be used. For highly accurate gauging, however, a pick-off of the very sensitive and stable kind described in either of the above-numbered patents is desirable.

In a modified form of the invention (not shown) the casing is replaced by a framework rigidly securing the stator of the pick-off to both ends of the torsion rod. Extending radially from the casing is an arm located so as to form with the probe arm a pair of calipers. Any variation of the distance between the caliper tips clearly varies the position of the rotor with respect to the stator and so results in a response of instrument 34 as before. It will be appreciated that this arrangement is merely a special case of that first described, the second arm taking the place of the plane table or other structure which supports the gauge and the workpiece.

As a variant of the arrangement last described, the caliper arm 51 (see FIG. 3) which is fixed to the framework of the gauge may be provided with two gauge tips 52 and 53 carried on rods 54 and 55 respectively. These two tips define with tip 24 of the probe arm 22 three points in the plane of movement of tip 24 which are not in a straight line and which therefore define a circular arc, rather than the straight line defined by the two caliper tips last described. Hence the three tips define the section 56 of a circular workpiece to be gauged. Conveniently, one of the fixed tips 52 or 53—tip 52 as depicted—defines with tip 24 a diameter of the section, but that is not essential.

Such an arrangement facilitates the rapid application of the gauge to the correct position on the workpiece.

Rods 54 and 55 may be threaded in arm 51 so that the positions of tips 52 and 53 with respect to tip 24 may be adjusted, thereby allowing the size of workpiece gauged to be varied. Provisions, conventionally depicted as locknuts 57, are made to secure the rods in the positions required so that tips 52 and 53 are fixed with respect to the gauge framework during the actual gauging operations.

Other arrangements employing two or more fixed gauge tips are available. For example, the use of three fixed tips carried by parallel rods with the probe arm tip disposed between them in the form of a spherometer causes a spherical surface to be defined and allows its radius to be gauged. With this arrangement it may be convenient to bend the probe arm so that the part which carries the tip is parallel to the rods which carry the fixed tips.

It will be appreciated that in each arrangement the fixed tip, or fixed tips, as the case may be, must be located so as to allow the gauging movement of the probe arm. For example, where there is one fixed tip it must not be located in line with the probe arm but should be placed so that the movement of the probe arm tip is towards or away from it.

A gauge in accordance with the invention is found to be extremely sensitive in operation and has in particular the advantages over known gauges for like purposes of including neither sliding elements nor coupled levers nor gear trains, each of which introduces errors due to friction and backlash.

We claim:

1. A comparator gauge comprising in combination a supporting framework, a torsion rod having between a centre portion and each end portion a torsional portion which is of less torsional rigidity than the centre portion and that end portion and which transforms smoothly into them, the end portions being secured to the framework against rotation with respect thereto, a probe arm secured at one end to the centre portion of the rod and extending radially from the rod for angular movement about the axis thereof to allow the tip of the free end of the arm to engage a workpiece, spring means for adjusting the datum angular position of the probe arm with respect to the framework in either direction of the probe movement, staying means secured to said probe arm and said framework and spaced from the secured end of the probe arm for staying the rod against deflections of its axis caused by movements of the probe tip parallel to the axis of the rod, an electrical pick-off responsive to the angular position of the probe arm with respect to the framework including a rotor secured to the centre portion of the rod and a co-operating wound stator secured to the framework, electrical stages structurally separate from said framework for deriving a measurement in response to the output of said pick-off, said stages including means for energising the network, display means for indicating the extent and sense of unbalance of the network, and means for adjusting the balance of the network independently of the probe arm position, thereby allowing the display means to be adjusted to a datum reading.

2. A comparator gauge comprising in combination a supporting framework, a torsion rod having between a centre portion and each end portion a torsional portion which is of less torsional rigidity than the centre portion and that end portion and which transforms smoothly into them, the end portions being secured to the framework against rotation with respect thereto, a probe arm secured at one end to the centre portion of the rod and extending radially from the rod for angular movement about the axis thereof to allow the tip of the free end of the arm to engage a workpiece, spring means for adjusting the datum angular position of the probe arm with respect to the framework in either direction of the probe movement, said spring means including a centralizing spring acting on said probe arm for defining a datum angular position of said arm on opposite sides of which the spring force is in opposite directions, means supported on said framework for adjusting said spring to vary the datum angular position of the probe arm with respect to the framework, said last-named means acting in the direction of angular movement of the probe arm, staying means secured to said probe arm and said framework and spaced from the secured end of the probe arm for staying the rod against deflection of its axis caused by movements of the probe tip parallel to the axis of the rod, said staying means being elastic enough flexurally to allow angular movement of the probe arm over the working range but inelastic enough lengthwise to prevent such parallel movements from deflecting the rod axis, a telemetering pick-off responsive to the angular position of the probe arm with respect to the framework including a rotor secured to the centre portion of the rod and a co-operating wound stator secured to the framework, the stator windings forming part of a bridge network the balance of which is dependent on the angular position of the rotor, electrical stages structurally separate from said framework for deriving a measurement from the response of the pick-off, said stages including means for energising the network and display means for indicating the extent and sense of unbalance of the network, and means for adjusting the balance of the network independently of the probe arm position, thereby allowing the display means to be adjusted to a datum reading.

3. A comparator gauge comprising a supporting framework, a torsion rod having between a centre portion and each end portion a torsional portion which is of less torsional rigidity than the centre portion and that end portion and which transforms smoothly into them, the end portions being secured to the framework against rotation with respect to it, a probe arm secured at one end to the centre portion of the rod and extending radially from the rod to allow the tip of the free end of the arm to engage a workpiece, a telemetering pick-off responsive to the angular position of the arm with respect to the framework, staying means secured to said probe arm and said framework and spaced from the secured end of the probe arm to stay the rod against deflections of its axis caused by movements of the probe tip parallel to that axis and means structurally separate from said framework for deriving a measurement from the response of said pick-off.

4. A comparator gauge comprising a supporting framework, a torsion rod having between a centre portion and each end portion a torsional portion which is of less torsional rigidity than the centre portion and that end portion and which transforms smoothly into them, the end portions being secured to the framework against rotation with respect to it, a probe arm secured at one end to the centre portion of the rod and extending radially from the rod to allow the tip of the free end of the arm to engage a workpiece, staying means to stay the rod against deflections of its axis caused by movement of the probe tip parallel to that axis and including at least one strut secured to the framework to extend parallel to the rod axis and secured centrally to the probe arm, the strut being elastic enough flexurally to allow angular movement of the probe arm over the working range, but inelastic enough lengthwise to prevent such deflections, a telemetering pick-off responsive to the angular position of the arm with respect to the framework and means structurally separate from said framework for deriving a measurement from the response of said pick-off.

References Cited by the Examiner
UNITED STATES PATENTS

| | | | |
|---|---|---|---|
| 611,350 | 9/98 | Brayton. | |
| 1,441,129 | 1/23 | Smith | 33—172 |
| 1,466,664 | 9/23 | Lowe | 33—172 |
| 2,129,311 | 9/38 | Street | 33—172 |
| 2,258,113 | 10/41 | Johnson | 33—148 |
| 2,713,207 | 7/55 | Foster | 33—147 |
| 2,886,892 | 5/59 | Banfill | 33—148 |
| 2,990,527 | 6/61 | Brown | 336—30 |

ISAAC LISANN, *Primary Examiner.*